United States Patent [19]

Marshall

[11] 4,413,069
[45] Nov. 1, 1983

[54] COMPOSITION WITH SELECTIVELY ACTIVE MODIFIER AND METHOD

[76] Inventor: Joseph W. Marshall, 1617 Beverly Blvd., Los Angeles, Calif. 90026

[21] Appl. No.: 422,446

[22] Filed: Sep. 20, 1982

[51] Int. Cl.³ .......................... C09D 5/32; C09D 7/14
[52] U.S. Cl. .................................. 523/205; 252/302; 252/350; 264/4; 428/402; 523/137; 523/210; 523/211
[58] Field of Search ............... 523/205, 137, 210, 211; 264/4; 428/402; 252/302, 350

[56] References Cited

U.S. PATENT DOCUMENTS

| 3,018,264 | 1/1962 | Colclough | 523/211 |
| 3,317,433 | 5/1967 | Eichel | 428/402 |
| 3,466,353 | 9/1969 | Turner | 264/4 |
| 3,600,346 | 8/1971 | Spatola | 428/151 |
| 3,669,899 | 6/1972 | Vassiliades et al. | 252/350 |
| 3,704,264 | 11/1972 | Gorman | 264/4 |
| 3,779,941 | 12/1973 | Powell | 264/4 |
| 4,092,285 | 5/1978 | Leo et al. | 523/205 |
| 4,211,668 | 7/1980 | Tate | 264/4 |
| 4,293,677 | 10/1981 | Imai | 428/402 |

FOREIGN PATENT DOCUMENTS 872438  7/1961  United Kingdom ............... 428/402

Primary Examiner—Ronald W. Griffin
Attorney, Agent, or Firm—Wagner & Bachand

[57] ABSTRACT

Method for in situ release into a matrix of modifying reagent by exposure of selectively responsive means to electromagnetic radiation using a composition comprising a modifiable matrix and means selectively releasing aliquot portions of modifier distributively through the matrix, the means comprising microcapsules containing a matrix-modifying effective amount of the modifier portions out of matrix contact and releasably in electromagnetic radiation-responsive relation, whereby the matrix is modified by contact with the modifier upon composition exposure to electromagnetic radiation.

24 Claims, No Drawings

4,413,069

COMPOSITION WITH SELECTIVELY ACTIVE MODIFIER AND METHOD

REFERENCE TO DISCLOSURE DOCUMENT

This application discloses and claims the contents of Disclosure Document No. 098305 filed Mar. 6, 1981.

TECHNICAL FIELD

This invention has to do with the selective, controllable modification of matrix materials by the release thereinto of a modifying agent. More particularly, the invention is concerned with composition and methods for the in situ release of modifying agents into formable or formed materials. In a particular aspect, the invention provides for the removal of paints from the surface to which they adhere by solvating the paint below its surface. In another aspect the invention provides for the polymerization of polymerizable moieties in place by the selective release of polymerizing reagents thereinto. In each instance of application of the teachings of the invention the composition to be modified, generally referred to as the matrix, is blended with, but not contacted by the modifier. This is achieved by adapting microencapsulation techniques to maintain the interacting materials out of contact until the desired moment, which can be years later in the case of ship hull paints, and applying the technology of microwave energy, generally referred to as electromagnetic radiation herein, to effect a release of the modifier on cue, by rupturing the walls of the microcapsules.

BACKGROUND ART

Microencapsulation of divers materials is known. In British Pat. No. 872,438, issued July 12, 1961 to The National Cash Register Company, techniques for encapsulating liquids are taught, which teachings are hereby incorporated in this disclosure by reference. It is believed, however, that the particular encapsulated materials taught herein have not heretofore been encapsulated for any purpose, and particularly not for the purposes of the present invention.

Similarly, innumerable methods have been proposed for the removal of paint and like polymeric films, e.g. adhesive films, from surfaces, but typically these have suffered from the need to get through the protective barrier set up by the paint or in other words to overcome the very strength of the paint, and this has required much labor and expensive apparatus and chemicals. In the present invention, the protective surface layer is by-passed, the solvating chemicals are released under the surface and effect solvation from within.

The achieving of uniform polymerization of monomeric compositions has mainly been a function of adequacy of blending of the reagents, which becomes more difficult as viscosity increases during polymerization progresses even if achievable to some degree initially. There is need therefor for means of distributing a polymerizing reagent through a polymerizable moiety and then simultaneously throughout the moiety effecting instant release of the reagent for uniformity in reaction and product therefor.

DESCRIPTION OF THE INVENTION

It is therefore an object of the invention to provide a novel method for the in situ introduction of a modifying agent such as a solvating modifier, or a polymerizing reagent, respectively to a film such as a paint to be dissolved from a surface, or to a polymerizable moiety for polymerization. It is another object to provide a novel product for carrying out the method, including a composition which is selectively responsive to electromagnetic radiation to release the modifying agent.

In general the foregoing objects are realized by using known microencapsulation techniques to encapsulate a modifier, an agent which heats preferentially to the capsule walls in response to exposure to electromagnetic radiation, e.g. a metal which heats in response to microwave exposure, and a liquid having a suitably low vapor pressure for encapsulation, but a sufficiently high vapor pressure when heated by proximity to the metal agent just mentioned when it is exposed to microwave energy, to rupture the walls of the microcapsules which have been distributively arranged beforehand in the matrix, typical useful liquids being e.g. water, alcohol, and low molecular weight hydrocarbons. It is contemplated that the rupturing liquid can be functional out of the capsules, e.g. a hydrocarbon such as toluene or N-methyl pyrrolidinone can function as both a microcapsule wall rupturer and a paint solvent after release.

Accordingly, the objects of the invention are realized by provision of a composition comprising a modifiable matrix and means selectively releasing aliquot portions of modifier distributively through the matrix, the means comprising microcapsules containing a matrix-modifying effective amount of the modifier portions out of matrix contact and releasably in electromagnetic radiation-responsive relation, whereby the matrix is modified by contact with the modifier upon composition exposure to electromagnetic radiation.

In particular embodiments of the composition the modifiable matrix comprises a synthetic organic polymeric film, and the modifier is a solvent for the polymer film.

In another embodiment, the matrix comprises polymerizable moiety, and the modifier is a polymerizing reagent for the matrix moiety.

Typically, the microcapsule comprises a synthetic organic polymer wall encapsulating the modifier portion, and within the microcapsule an electromagnetic-radiation responsive agent differentially heating-responsive to the radiation relative to the microcapsule wall. There is further included within the microcapsule a liquid having a heat responsive vapor pressure, the liquid acting within the microcapsule in wall-rupturing relation by increase in vapor pressure responsive to heating, and also within the microcapsule an electromagnetic-radiation responsive agent differentially heating responsive to the radiation relative to the microcapsule wall in liquid vapor pressure increasing relation. The agent is preferably a metal, such as a finely divided metal, and is in contact with the liquid which the agent is to heat for purposes of liquid vapor pressure increase or even volatilization and generation of sufficient pressure within each individual capsule to rupture the microcapsule wall and release the modifier.

In a particularly preferred embodiment, the invention provides a composition in which the modifiable matrix comprises a synthetic organic polymeric film, the liquid comprises a low molecular weight hydrocarbon liquid, and the microcapsule comprises a synthetic organic polymer wall encapsulating the liquid hydrocarbon and the metal agent therein. Typically in such embodiments, the synthetic organic polymeric film is a paint film, the liquid hydrocarbon being a solvent for the paint film when released below the surface thereof by rupture of the microcapsules. Preferred liquid hydrocarbons for use as solvents are aromatic e.g. toluene or the like, e.g. N-methyl-pyrrolidinone.

In such particularly preferred embodiments, the synthetic organic polymeric film can be an adhesive film, the liquid hydrocarbon being a solvent for the adhesive film when released therein by rupture of the microcapsules.

In another particularly preferred embodiment, the matrix comprises a polymerizable moiety, such as precursor moieties of epoxy, polyester, styrene and like olefin or urethane polymers.

There is then provided within the microcapsule as a modifier the coreactant polymer precursor moiety, e.g. a polyfunctional compound which is contained in the microcapsules as a polymerizing reagent, and a liquid having a heat responsive vapor pressure, the liquid acting within the microcapsule in microcapsule wall-rupturing relation by increase in vapor pressure responsive to heating.

In this embodiment, the matrix moiety and the polymerizing reagent modifier are selected from pairs comprising a glycol and a dicarboxylic acid precursors of a polyester resin, a glycol and an isocyanate compound precursors for a urethane resin, a bisphenol and an epichlorohydrin product, and acid anhydride or polyfunctional amine precursors for an epoxy resin, or a liquid olefin such as styrene and a free-radical generator such a benzoyl peroxide precursors for styrene polymer.

Thus in one embodiment of the present composition, the microcapsule comprises a synthetic organic polymer wall encapsulating for reaction with the matrix one the polymerizable moieties or polymerizing reagents not present in the matrix, and also the liquid for vapor pressure obtention and the metal agent for heat generation.

The invention further contemplates provision of the method of in situ solvating a polymeric film which includes maintaining distributed within the film a multiplicity of discrete microcapsules comprising a synthetic organic polymeric wall encapsulating an aliquot portion of a liquid hydrocarbon solvent for the film, and an electromagnetic radiation heat responsive agent, and exposing the film and the microcapsules therein to electromagnetic radiation sufficient to heat the metal in hydrocarbon solvent vapor pressure increasing relation to rupture the microcapsules and release the solvent and in situ solvate the film from within thereby.

In another embodiment the invention provides the method of in situ polymerizing a polymerizable moiety in a composition which includes maintaining distributed within the composition a multiplicity of discrete microcapsules comprising a synthetic organic polymeric wall encapsulating a polymerizing reagent in an amount sufficient to polymerize the moiety, a liquid and an electromagnetic radiation heat responsive agent, and exposing the composition and the microcapsules therein to electromagnetic radiation sufficient to heat the metal in liquid vapor pressure increasing relation to rupture the microcapsules and release the polymerizing reagent into polymerizing contact with the composition moiety.

More generally, the invention contemplates internally modifying a composition by the method which includes releasing into the composition a modifier by electromagnetic radiation induced rupture of microcapsules containing the modifier, e.g. distributing microcapsules containing a blowing agent as the modifier through a selected curable liquid as the composition, and releasing the blowing agent into and thereby foaming the composition.

PREFERRED MODES

The term "microcapsule" herein and its cognitives has reference to minute, generally spheroidal bodies of such size that that they are visible or nearly so to the unaided human eye but too small to be handled by other than mechanical means and which typically and as described in the aforementioned British Pat. No. 872,438 comprise a spherical wall of synthetic organic polymeric material, e.g. polymers of styrene, divinyl benzene, polyethylenemaleic anhydride copolymer, and vinyl analogs thereof, or gelatin, gelatin complexes with vegetable hydrophyllic colloids such gum arabic, protein film forming materials especially zein and the like. The interior void in the microcapsule is filled with a modifier, essentially by emulsifying the modifier in a suitable medium with the metal agent and the vapor pressure producing liquid therewith, adding the wall forming material and so adjusting the medium pH as to cause the wall-former to surround and encapsulate the modifier as it is suspended in the emulsion. Various specific methods are set out in the British patent mentioned, and still other methods are generally known.

The term "modifier" herein refers to a compound or composition which will alter the physical or chemical properties of another material into which it is released or brought into contact. In accordance with the invention a modifier, encapsulated in a microcapsule, is combined into a host or matrix material which then constitutes the other material or the material to be modified. Examples are given below, as illustrative of the broad range of materials useful as modifier and modified materials.

The modifier is distributed throughout the material to be modified in order that the reaction or physical change sought may be effected simultaneously throughout. The term distributive herein is used to describe this wide dispersal of the modifier in the material to be modified.

Electromagnetic radiation is used to heat the metal agent as noted. Suitable frequencies are in the microwave range e.g. 5 to 10 GHz, and power levels are set at needed values. It is useful to employ a portable microwave generator which can be hand-held to the work, particularly in ship paint removal, such as the device described in NASA Technical Brief LAr-12540 "Plastic Welder" published Summer 1980.

It will be noted that by use of electromagnetic radiation as taught herein and by virtue of the presence of the metal heatable element and vapor pressure liquid in the microcapsules, the need for heating contact with the surface being treated as in paint removal is obviated, a significant consideration particularly where the object being cleaned of paint is a heat sink, such as a ship hull. In practice where it is desired to remove paint from a ship hull, the hull having earlier been painted with a paint having encapsulated modifier according to the present invention therein, the worker traverses the area to be cleaned with the microwave source, the metal agent within the microcapsule heats, the liquid in contact with the metal typically is the modifier in this situation, e.g. is N-methyl pyrrolidione or toluene, the liquid vapor pressure increases and the liquid may boil, the resultant pressure ruptures the microcapsule wall, releasing the liquid, now acting as a paint solvent, underneath the perdurable skin of the paint, the paint is dissolve at its adhesion to the ship hull and is easily scraped off, leaving a remarkable clean surface for conditioning and repainting. As noted herein, solid blowing agents can be incorporated in the microcapsules alone for purpose of foaming a structure, or such blowing agent incorporating microcapsules may be combined with paint solvent microcapsules, both to be released on irradiation by microwave energy, with the result of solvating the paint from within and lifting and expanding the solvated paint from the painted surface by action of the blowing agents, thus aiding the paint removal process.

The invention composition is similarly applicable to non-rigid coatings and bonding layers such as gum or resin adhesives, with the adhesive being substituted for the paint or like polymeric film.

It is also evident that the depolymerization steps outlined can be reversed, to effect polymerization, by use of a polymerization reagent as the modifier and a polymerizable material as the matrix, again release of the former into the latter being effected by microwave irradiation of a microcapsule containing the modifier, a metal agent for heating and a liquid susceptible to sufficient increase in vapor pressure by the metal agent heating to rupture the microcapsule walls. It will be noted in this connection that condensation polymerization, free radical polymerization and cross-linking type polymerization can be effected by appropriate selection of reactants.

In the polymerization aspects of the invention, the choice of liquids is broader if the liquid is not needed or desired to act as a solvent as well as a vapor pressure generator. Thus in addition to hydrocarbons in the normally liquid range of molecular weight, and substituted hydrocarbons such as N-methyl pyrrolidinone, water and alcohols of suitable viscosity can be used which are non-solvents for the microcapsule wall. These liquids can be used in the depolymerization embodiments if another agent is present to effect the depolymerization.

EXAMPLE 1

To 90 volumes of household paint (Sears Latex Semigloss Product 78114) was added 10 volumes of microencapsulated toluene and metal agent. The microcapsules were about 10 to 40 microns in average diameter, and contained about 82.5% by weight toluene, 2.5% by weight leafing grade aluminum flake (Aluminum Company of America Powder No. 1663) precoated with stearic acid for compatibility with the toluene. The paint appeared somewhat grainy as a result of the incorporation of the microcapsules therein. The modified paint and an unmodified portion as a control were painted onto wood panels and left to dry overnight at room temperature. Both panels were hard and glossy the next day. Each was placed in a household microwave oven and exposed to microwave radiation therein at a medium setting for two minutes. There was no discernible heating of the panels. The panel having the paint composition of the invention was easily stripped of its paint by simply wiping by hand with a Kleenex (trademark) tissue. The control paint coating, however, was hard and tenaciously adherent to the panel surface.

EXAMPLE 2

The principles of the foregoing example are applied to removal of anti-fouling paint from a ship bottom by incorporating in such paint prior to application, the microencapsulated solvent, additional liquid if desired, and a metal agent. The paint is readily removed by passing a microwave radiation generator along the surface, in the water if desired, and thereafter wiping the softened paint from the ship bottom.

EXAMPLE 3

Paper packaging edge margin sealed to itself with an adhesive according to the invention, i.e. one containing in addition to the usual low molecular weight "sticky" polymers a distributively arranged microencapsulated solvent system including the solvent, another vapor pressure producing liquid if desired and a metal agent heating responsive to microwave energy. Radiation of the adhesive releases the solvent, unsticking the packaging edge margins.

EXAMPLE 4

Diglycidyl ether of bisphenol-A, an epoxy resin monomer to be used as a protective coating is prepared with microencapsulated curing agent in the form of a polyfunctional amine in not less than a stoichiometric amount. The amine is encapsulated with water, and finely divided metal in accordance with the invention. After applying the monomer to the surface to be protected by a simple unhurried spraying process, possible because there is no threat of premature cure during application, the applied coating is exposed to microwave radiation, the metal heats, the water within the microcapsules boils, the microcapsule walls rupture, the amine is released throughout the epoxy monomer and a rapid cure is effected, producing a hard protective coating immune to chemical attack.

EXAMPLE 5

Example 4 is repeated but applying the epoxy as a bonding agent between opposed wall members. Adhesion is swift and permanent upon release of the amine curing agent.

EXAMPLE 6

A ceramic composition is foamed in situ by incorporating thereinto a sufficient quantity of microcapsules containing sodium azide blowing agent, a flake metal, and a hydrocarbon inert to the blowing agent. After mixing the ceramic is poured into a mold and exposed to microwave radiation. The microcapsules burst, releasing the blowing agent, foaming the ceramic mass as it is shaped in the mold.

The amounts of modifier, be it solvent, polymerizing reagent, blowing agent, curing agent or other modifier typically incorporated in the matrix are the same or slightly more or less than is used in the absence of microencapsulation to effect the same result, i.e. solution, polymerization, foaming, cure or other modifying change. The needed amount is divided among the microcapsules, with individual capsule amounts and ratios of capsule to capsule content dependent of the individual chemistry of the materials being used in the microencapsulation process. The amount of metal or other heating agent used and the amount of liquid employed can be widely varied to suit particular compounding or use criteria, bearing in mind that sufficient liquid to provide wall-rupturing vapor pressure is to be used, and the heating element is adapted to effect the needed vapor pressure in the given liquid.

SUMMARY

In summary the invention meets the objectives set forth in providing a composition and method for the in situ treatment of polymer films to solvate them or to create polymers by selective release of polymerizing reagents thereinto. Combinations and sequences of these operations can be realized by the use of differently composed and/or differently prepared microcapsules.

I claim:

1. Composition comprising a modifiable matrix and means selectively releasing aliquot portions of modifier distributively through said matrix, said means comprising microcapsules containing a matrix-modifying effective amount of said modifier portions out of matrix contact and a microwave electromagnetic-radiation responsive agent differentially heating-responsive to said radiation relative to the wall of said microcapsule, whereby said modifier is retained within said microcapsules in microwave electromagnetic radiation-responsive releasable relation and said matrix is modified by contact with said released modifier upon composition exposure to said radiation.

2. Composition according to claim 1, in which said modifiable matrix comprises a synthetic organic polymeric film.

3. Composition according to claim 2, in which said modifier is a solvent for said polymer film.

4. Composition according to claim 1, in which said matrix comprises a polymerizable moiety.

5. Composition according to claim 4, in which said modifier is a polymerizing reagent for said moiety.

6. Composition according to claim 1, in which said microcapsule comprises a synthetic organic polymer wall encapsulating said modifier portion.

7. Composition according to claim 1, including also within said microcapsule a liquid having a heat-responsive vapor pressure, said liquid acting within said microcapsule in microcapsule wall-rupturing relation by increase in vapor pressure responsive to heating.

8. Composition according to claim 7, including also within said microcapsule an electromagnetic-radiation responsive agent differentially heating responsive to said radiation relative to said microcapsule wall in liquid vapor pressure increasing relation.

9. Composition according to claim 8, in which said agent is a metal.

10. Composition according to claim 9, in which said metal agent is finely divided within said microcapsule.

11. Composition according to claim 9, in which said metal agent is in contact with said liquid.

12. Composition according to claim 10, in which said modifiable matrix comprises a synthetic organic polymeric film, said liquid comprises a low molecular weight hydrocarbon liquid, and said microcapsule comprises a synthetic organic polymer wall encapsulating said liquid hydrocarbon and said metal agent therein.

13. Composition according to claim 12, in which said synthetic organic polymeric film is a paint film, said liquid hydrocarbon being a solvent for said paint film when released below the surface thereof by rupture of said microcapsules.

14. Composition according to claim 13, in which said liquid hydrocarbon is toluene or N-methyl-pyrrolidinone.

15. Composition according to claim 12, in which said synthetic organic polymeric film is an adhesive film, said liquid hydrocarbon being a solvent for said adhesive film when released therein by rupture of said microcapsules.

16. Composition according to claim 9, in which said matrix comprises a polymerizable moiety.

17. Composition according to claim 16, in which said polymerizable moiety is a polyfunctional compound, said microcapsules containing a polymerizing reagent therefor as said modifier.

18. Composition according to claim 17, including also within said microcapsule a liquid having a heat-responsive vapor pressure, said liquid acting within said microcapsule in microcapsule wall-rupturing relation by increase in vapor pressure responsive to heating.

19. Composition according to claim 18, in which said matrix moiety and polymerizing reagent modifier are selected from pairs comprising a glycol and a dicarboxylic acid, a glycol and an isocyanate compound, a bisphenol and epichlorohydrin product and polyfunctional acid, anhydride, or amine, and a liquid olefin and an organic peroxide.

20. Composition according to claim 19, in which said microcapsule comprises a synthetic organic polymer wall encapsulating for reaction with said matrix the one of said polymerizable moieties or said polymerizing reagents not present in said matrix, and also said liquid and said metal agent.

21. Method of in situ solvating a polymeric film which includes maintaining distributed within said film a multiplicity of discrete microcapsules comprising a synthetic organic polymeric wall encapsulating an aliquot portion of a liquid hydrocarbon solvent for said film, and an electromagnetic radiation heat responsive agent, exposing said film and the microcapsules therein to electromagnetic radiation sufficient to heat said metal in hydrocarbon solvent volatilizing relation to rupture said microcapsules and release said solvent and in situ solvate said film from within thereby.

22. Method of in situ polymerizing a polymerizable moiety in a composition which includes maintaining distributed within said composition a multiplicity of discrete microcapsules comprising a synthetic organic polymeric wall encapsulating a polymerizing reagent in an amount sufficient to polymerize said moiety, a liquid and a microwave electromagnetic radiation heating responsive agent comprising a metal, exposing said composition and the microcapsule therein to microwave electromagnetic radiation sufficient to heat said metal in liquid vapor pressure increasing relation to rupture said microcapsules and release said polymerizing reagent into polymerizing contact with said composition moiety.

23. Method of internally modifying a composition which includes releasing into said composition a modifying agent by electromagnetic radiation induced rupture of microcapsules containing said modifying agent.

24. Method according to claim 23, including also selecting a liquid composition, distributing microcapsules containing a blowing agent through said composition, releasing said blowing agent into and thereby foaming said composition.

* * * * *